United States Patent
Sato (10) Patent No.: US 7,630,443 B2
(45) Date of Patent: Dec. 8, 2009

(54) VIDEO DECODING APPARATUS AND METHOD

(75) Inventor: Kazushi Sato, Chiba (JP)

(73) Assignee: Sony Corporation, Tokyo (JP)

( * ) Notice: Subject to any disclaimer, the term of this patent is extended or adjusted under 35 U.S.C. 154(b) by 865 days.

(21) Appl. No.: 10/833,980

(22) Filed: Apr. 27, 2004

(65) Prior Publication Data

US 2005/0002646 A1    Jan. 6, 2005

(30) Foreign Application Priority Data

Apr. 28, 2003   (JP)   ............................. 2003-123977

(51) Int. Cl.
  *H04N 7/12*   (2006.01)
  *H04N 11/02*  (2006.01)
  *H04N 11/04*  (2006.01)
  *H04B 1/66*   (2006.01)

(52) U.S. Cl. ................................. 375/240.29
(58) Field of Classification Search ............. 375/240.29
  See application file for complete search history.

(56) References Cited

U.S. PATENT DOCUMENTS 5,627,809 A * 5/1997 Honjo ..................... 369/47.43
5,787,225 A * 7/1998 Honjo ......................... 386/105
5,959,796 A * 9/1999 Matsumi et al. ............... 360/48
2003/0174771 A1* 9/2003 Sugahara et al. ....... 375/240.03

FOREIGN PATENT DOCUMENTS

| JP | 01-296871 | 11/1989 |
| JP | 08-265689 | 10/1996 |
| JP | 10-164519 | 6/1998 |
| JP | 2002-064820 | 2/2002 |
| JP | 2003-046956 | 2/2003 |

OTHER PUBLICATIONS

ISO/IEC 14496-2, Third Edition, Jun. 1, 2004.

* cited by examiner

*Primary Examiner*—Nhon T Diep
(74) *Attorney, Agent, or Firm*—Finnegan, Henderson, Farabow, Garrett & Dunner, L.L.P.

(57) ABSTRACT

A video decoding apparatus and method capable of performing high-speed reproduction of image data subjected to coding with a prescribed coding scheme for adaptively performing field-structured or frame-structured coding, with a simple configuration. In a high-speed reproduction mode, a decoding process is applied to only coded image data of intra-frame coded pictures subjected to the frame-structured coding or of one field in the intra-frame coded pictures and coded image data of intra-field coded pictures subjected to the field-structured coding.

10 Claims, 11 Drawing Sheets

| $QP_{AV}$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 0 | 0 | 0 | 0 | 4 | 4 | 5 | 6 | 7 | 9 |
| β | 0 | 0 | 0 | 0 | 0 | 0 | 0 | 0 | 0 | 0 | 0 | 0 | 0 | 0 | 0 | 0 | 0 | 0 | 0 | 3 | 3 | 3 | 3 | 4 | 4 | 4 |

| $QP_{AV}$ | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 10 | 12 | 14 | 17 | 20 | 24 | 28 | 33 | 39 | 46 | 55 | 65 | 76 | 90 | 106 | 126 | 148 | 175 | 207 | 245 | 255 | 255 | 255 | 255 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

FIG.10

| QPav | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| Bs=1 | 0 | 0 | 0 | 0 | 0 | 0 | 0 | 0 | 0 | 0 | 0 | 0 | 0 | 0 | 0 | 0 | 0 | 0 | 0 | 0 | 4 | 4 | 5 | 6 | 7 | 9 |
| Bs=2 | 0 | 0 | 0 | 0 | 0 | 0 | 0 | 0 | 0 | 0 | 0 | 0 | 0 | 0 | 0 | 0 | 0 | 0 | 0 | 3 | 3 | 3 | 3 | 4 | 4 | 4 |
| Bs=3or4 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 |

| QPav | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| Bs=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| Bs=2 | 1 | 1 | 1 | 1 | 1 | 2 | 2 | 2 | 3 | 3 | 3 | 3 | 4 | 4 | 5 | 5 | 6 | 7 | 8 | 8 | 10 | 11 | 12 | 13 | 15 | 17 |
| Bs=3or4 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

VIDEO DECODING APPARATUS AND METHOD

BACKGROUND OF THE INVENTION

1. Field of the Invention

This invention relates to a video decoding apparatus and method, and more particularly, is suitably applied to a video decoding apparatus, for example, in conformity with the Joint Model of Enhanced-Compression Video Coding (JVT) scheme.

2. Description of the Related Art

Video processing apparatuses in conformity with a video coding scheme such as Moving Picture Experts Group (MPEG) for efficient information transmission and storage have been popular for both information providers such as broadcast stations and information receiver such as general users.

Specifically, the MPEG2 (ISO/IEC 13818-2) format is defined as a general-purpose video coding scheme, and now it is widely used for various applications for professionals and consumers because it can handle all of an interlace scanning (interlace) format, a progressive scanning (non-interlace) format, a standard-resolution image format, and a high-resolution image format.

With this MPEG2 format, standard resolution (720×480 pixels) images of the interlace format and high resolution (1920×1088 pixels) images of the interlace format can be transmitted at bit rates of 4-8 Mbps and 18-22 Mbps, respectively.

With popularization of portable terminals such as mobile telephones, a coding scheme at a much higher compression rate is demanded. To meet this demand, an MPEG4 format was approved as a new video coding scheme as ISO/IEC 14496-2 in December 1998.

Further, for video coding for video conference, the standardization of a video coding scheme called H. 26L (ITU-T Q6/16 VCEG) has been progressing. This H. 26L is known as a coding scheme providing higher coding efficiency although more operations are required for coding and decoding, as compared with conventional coding schemes such as the MPEG2 and MPEG4.

In addition, the standardization of a JVT coding scheme which is a video coding scheme providing much higher coding efficiency have been progressing as well. This JVT coding scheme is realized based on the H. 26L by also employing functions that the H. 26L does not have (for example, refer to non patent reference DRAFT ISO/IEC 1/4 496-10:2002 (E)).

Figure 1:
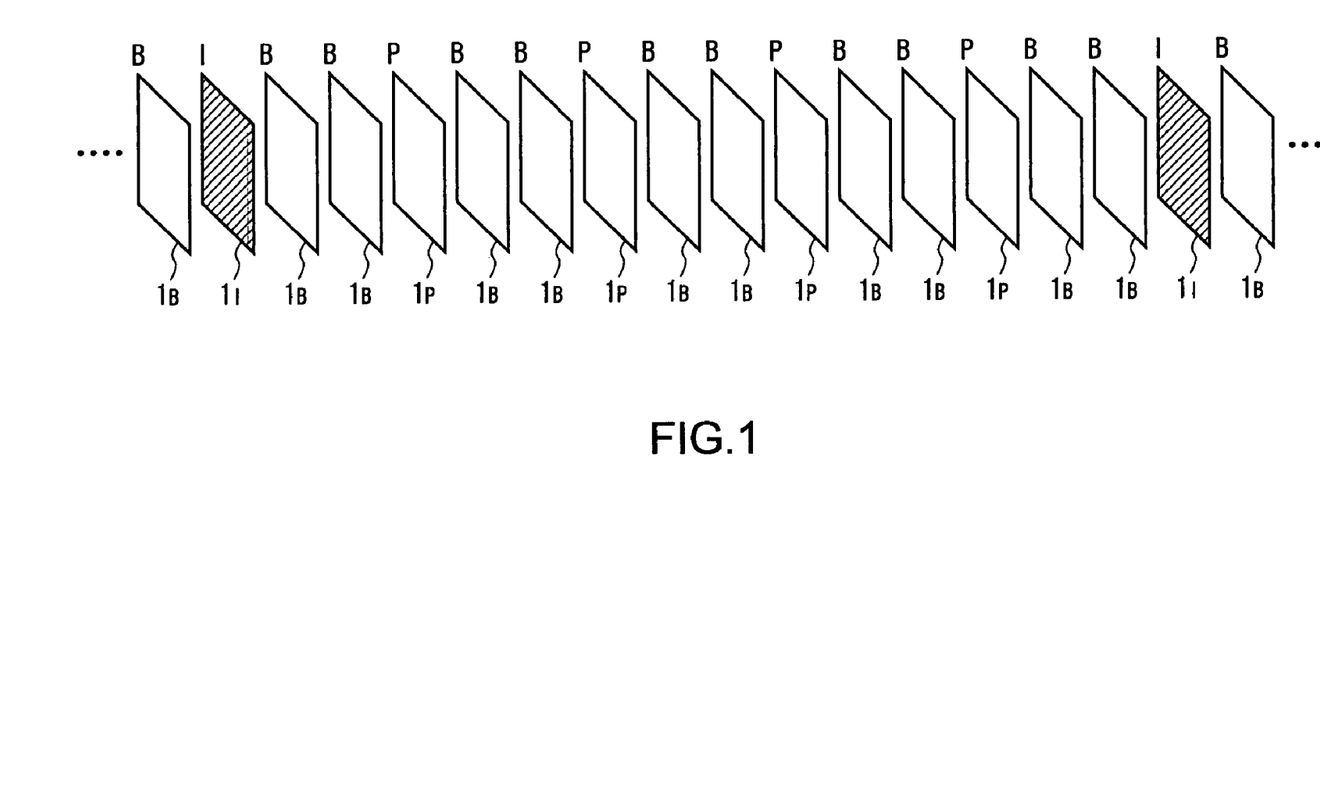
FIG. 1 is a conceptual view of arrangement of types of pictures coded with a JVT coding scheme.

By the way, if image data (hereinafter, referred to as JVT coded image data) subjected to compression and coding with the JVT coding scheme as described above can be decoded by only reproducing (decoding) the image data of I-pictures (intra-coded picture) $1_I$ out of I-pictures, P-pictures (inter frame predictive-coded picture) $1_P$ and B-pictures (bidirectionaly predictive-coded picture) $1_B$, as shown in FIG. 1, a motion compensation process which is required for the reproduction of the P-pictures $1_P$ and B-pictures $1_B$ can be omitted, thereby realizing high-speed reproduction.

The JVT coding scheme, however, defines that a filtering process (hereinafter, referred to as a deblock filtering process) is performed on block borders of decoded pictures in order to reduce block noise specific to a block segmentation coding format. Although the existing techniques perform a reproduction process of only I-pictures $1_I$, they cannot execute sufficient high-speed reproduction because the deblock filtering process requires a large amount of operations.

Figure 2A:
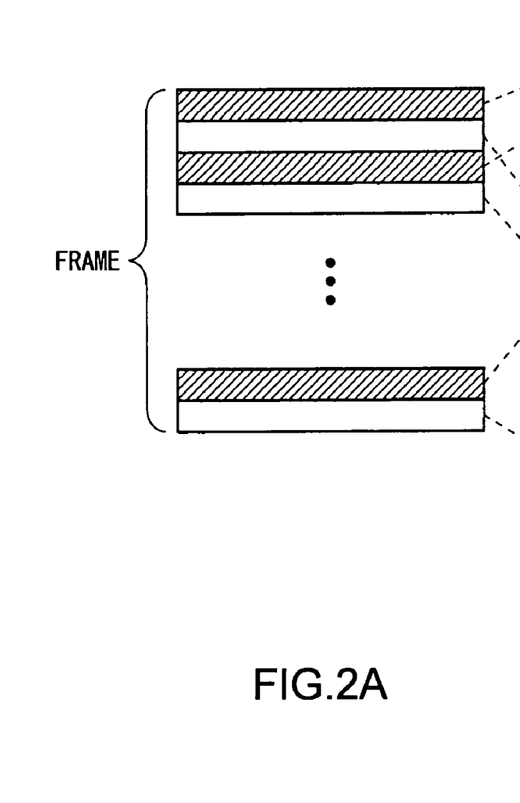
FIGS. 2A and 2B are conceptual views explaining a picture-based coding mode.
Figure 2B:
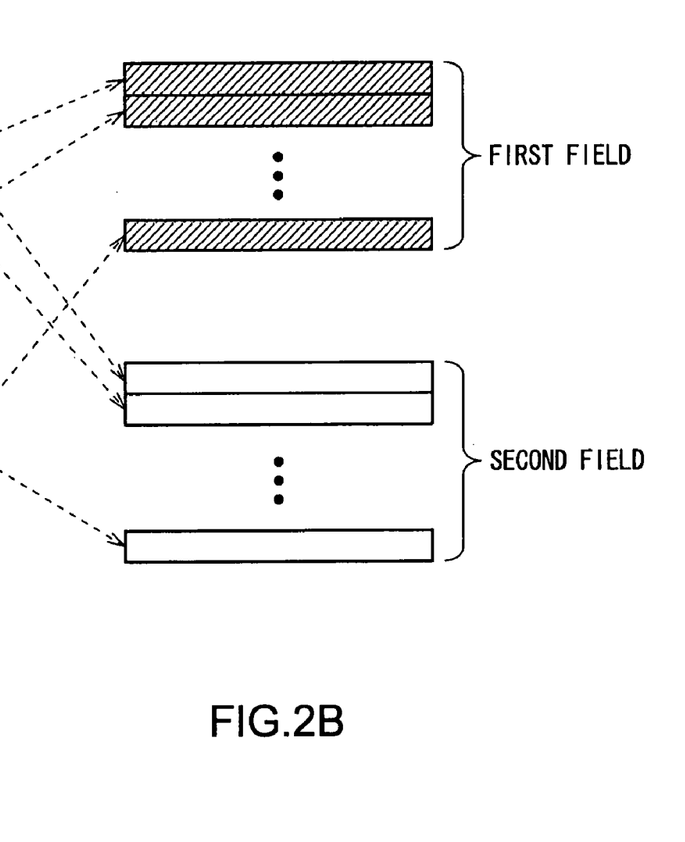
Figure 3:
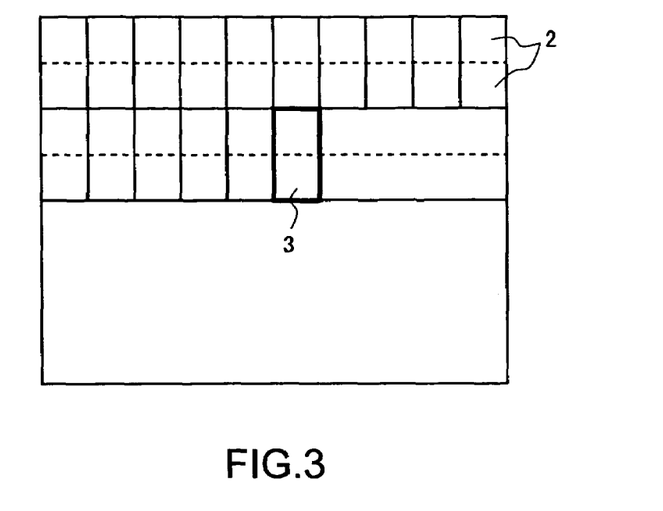
FIG. 3 is a conceptual view explaining a macroblock-based coding mode.

As a coding mode in a case where pictures to be coded is in the interlace format, the JVT coding scheme has a picture-based coding mode with a frame as shown in FIG. 2A or a field as shown in FIG. 2B (first and second fields) as a coding unit and a macroblock-based coding mode with a macroblock pair 3 composed of two macroblocks 2 locating above and below as shown in FIG. 3 as a coding unit.

Note that, in the field-structured coding mode with a field as shown in FIG. 2B as a coding unit, the value of field_pic_flag included in a slice header of JVT coded image data is set to "1". In the frame-structured coding mode with a frame as shown in FIG. 2A as a coding unit, the value of field_pic_flag is set to "0" and the value of mb_adptive_frame_field_flag included in a sequence parameter set is set to "0". In the coding mode with the macroblock pair 3 as a coding unit as shown in FIG. 3, the value of field_pic_flag of a slice header is set to "0" and the value of mb_adptive_frame_field_flag of a sequence parameter set is set to "0".

In addition, in the JVT coding scheme, considering that the field-structured coding is more effective for pictures of the interlace format having a large amount of motion, than the frame-structured coding, the frame-structured coding and the field-structured coding are adaptively changed picture by picture when pictures to be coded are in the interlace format.

Figure 4:
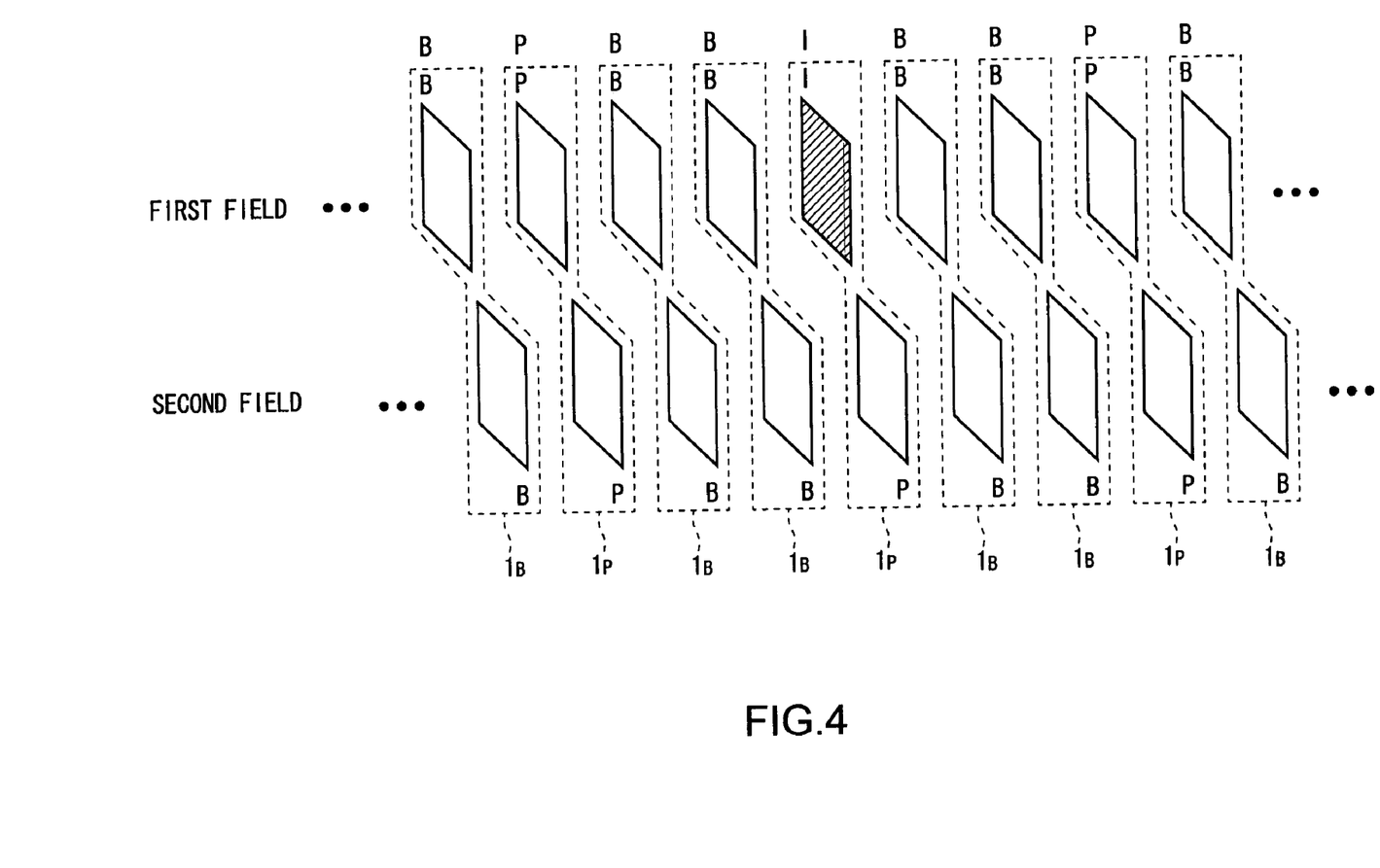
FIG. 4 is a conceptual view explaining coding of pictures of an interlace format.

Further, when the field structure is applied as a coding unit in a case where pictures to be coded are in the interlace format, the JVT coding scheme allows the first field of an I-picture $1_I$ to be coded within this field (hereinafter, referred to as intra-field coding) (I-field) and the second field to be coded by reference to past field pictures (P-field) as shown in FIG. 4.

Therefore, to decode I-pictures $1_I$ of which the first and second fields has been coded as an I-field and a P-field, respectively, corresponding reference pictures have to be decoded in advance for decoding the second field (P-field).

Figure 5:
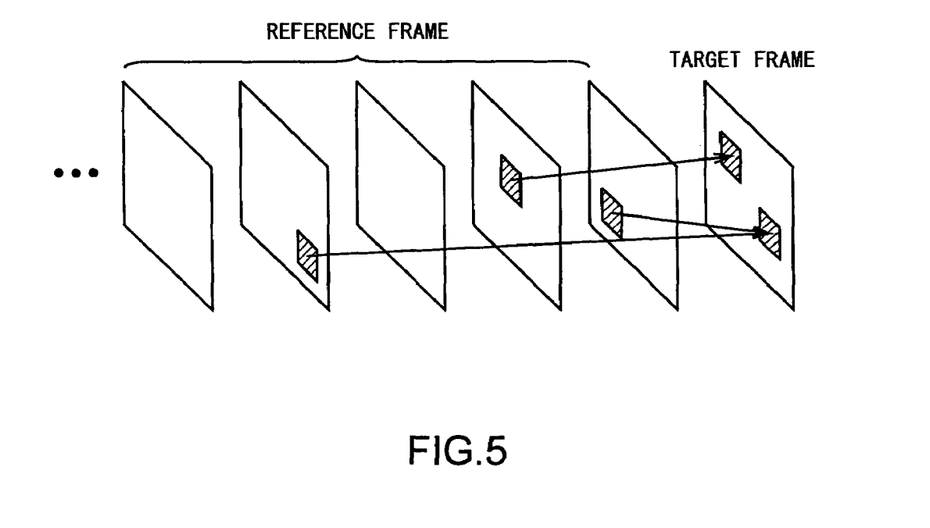
FIG. 5 is a conceptual view explaining a multiple reference frame function.

For this case, in the JVT coding scheme, a multiple reference frame function is supported to use more than two frame pictures before and after a target frame picture as reference pictures for the motion compensation process at the time of coding as shown in FIG. 5.

Figure 6:
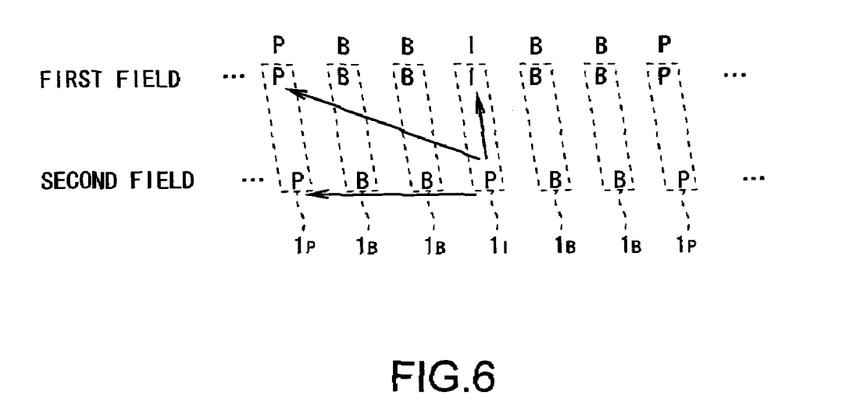
FIG. 6 is a conceptual view explaining reference pictures in the multiple reference frame function.

Therefore, as shown in FIG. 6, to decode the I-picture of which the second field is a P-field, if the P-field uses field pictures of P-pictures $1_P$ and B-pictures $1_B$ other than the I-picture as reference pictures, the P-pictures $1_P$ and B-pictures $1_B$ should be decoded.

In short, in the JVT coding scheme, in a case where pictures to be coded are in the interlace format, the reproduction process of only I-pictures $1_I$ may not create decoded video, so that this scheme has a problem that high-speed reproduction by reproduction of only I-pictures $1_I$ can not be realized.

SUMMARY OF THE INVENTION

In view of the foregoing, an object of this invention is to provide a video decoding apparatus and method capable of performing high-speed reproduction with a simple configuration.

The foregoing object and other objects of the invention have been achieved by the provision of a video decoding apparatus comprising a decoding means for performing a decoding process on coded image data and a control means for controlling the decoding means. The control means controls the decoding means so as to decode only coded image data of intra-frame coded pictures subjected to frame-structured coding or of one filed of the intra-frame coded pictures and coded image data of intra-field coded pictures subjected to field-structured coding.

As a result, this video decoding apparatus is able to sequentially decode only intra-frame coded pictures and intra-field coded pictures without performing a complicated motion compensation process.

Further, in this invention, with a video decoding method, in a high-speed reproduction mode, a decoding process is performed on only coded image data of intra-frame coded pictures subjected to frame-structured coding or of one field of the intra-frame coded pictures and coded image data of intra-field coded pictures subjected to field-structured coding.

As a result, with this video decoding method, only intra-frame coded pictures and intra-field coded pictures can be sequentially decoded without performing a complicated motion compensation process.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Deblock Filtering Process

First the above-described deblock filtering process employed in the above-described JVT coding scheme will be described.

The deblock filtering process is a filtering process which applies filtering to each boarder (hereinafter, referred to as block boarder) of neighboring 4×4 blocks in a decoded picture in order to reduce block noise specific to the block segmentation coding format. In the JVT coding scheme, a decoded picture is used as not only an output picture but also a reference picture for successive frames, so that the deblock filtering process of decoded pictures creates smooth reference pictures without block noise, resulting in improving coding efficiency and picture quality.

With defining strength of filtering to be applied to a block boarder as Boundary Strength (hereinafter, referred to as filtering strength Bs), the deblock filtering process applies filtering to each block boarder with the most appropriate strength. The value of the filtering strength Bs is referred to determine whether to apply the deblock filtering to a block boarder and to define the maximum value of picture value variation after the deblock filtering.

The maximum pixels to be corrected by filtering at each block boarder are four pixels: two pixels neighboring the boarder and pixels next to the two pixels. With the value of filtering strength Bs and the smoothness of the pixels as threshold values, it is determined which pixels out of four pixels are corrected by filtering. Basically, in a case where neighboring pixels have little differences (in a case of smoothness or no edge), the values of the four pixels are corrected by filtering.

In this case, all four pixels to be corrected are not directly subjected to the filtering process. A difference value from an original pixel value is calculated and added. Specifically, a same absolute value is added to two pixels neighboring a block boarder. The maximum value of the difference absolute value is found from a prescribed table based on the values of a quantization parameter QP and filtering strength Bs. A larger difference value is allowed as the quantization parameter QP and the filtering strength Bs are larger.

In a case where the value of filtering strength Bs is 4, that is, a block boarder is a boarder between macroblocks (hereinafter, referred to as a macroblock boarder) and at least one 4×4 block is an intra block, stronger five tap filtering is applied because the block boarder may appear remarkably.

Figure 7A:
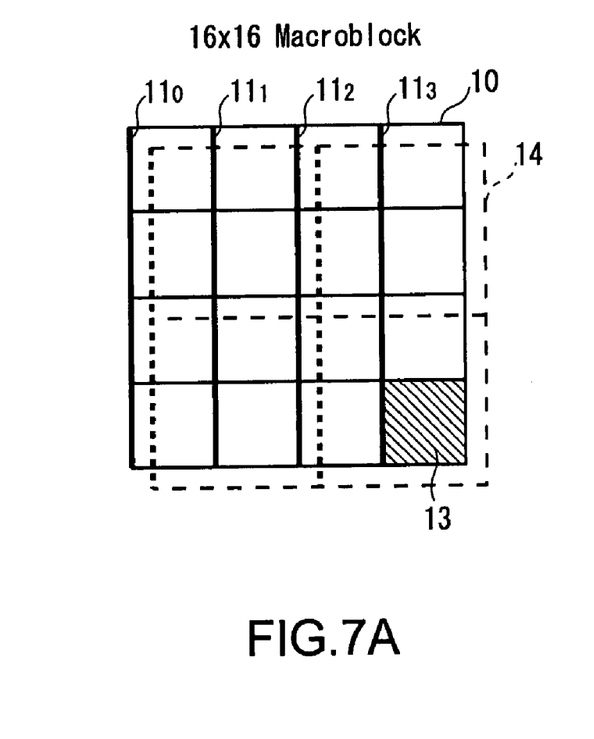
FIGS. 7A, 7B and 9 are conceptual views explaining a deblock filtering process.
Figure 7B:
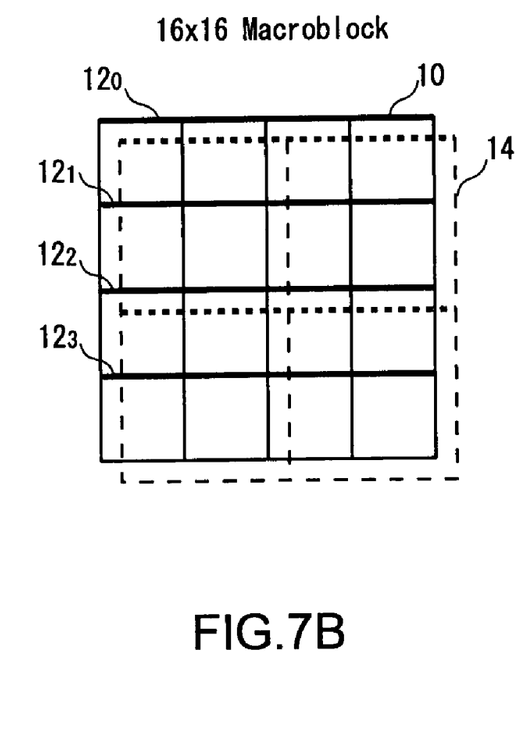

The deblock filtering process of this case is a process with conditions for decoded pictures and is performed macroblock by macroblock. Specifically, as shown in FIGS. 7A and 7B, horizontal filtering is applied to three vertical boarders $11_1$ to $11_3$ in a macroblock 10 of 16×16 pixels, vertical filtering is next applied to three horizontal boarders $12_1$, to $12_3$, and then the filtering process is applied to the left and top macroblock boarders $11_0$ and $12_0$ of the macroblock 10. The filtering process is not applied to the edges of a picture.

Figure 8:
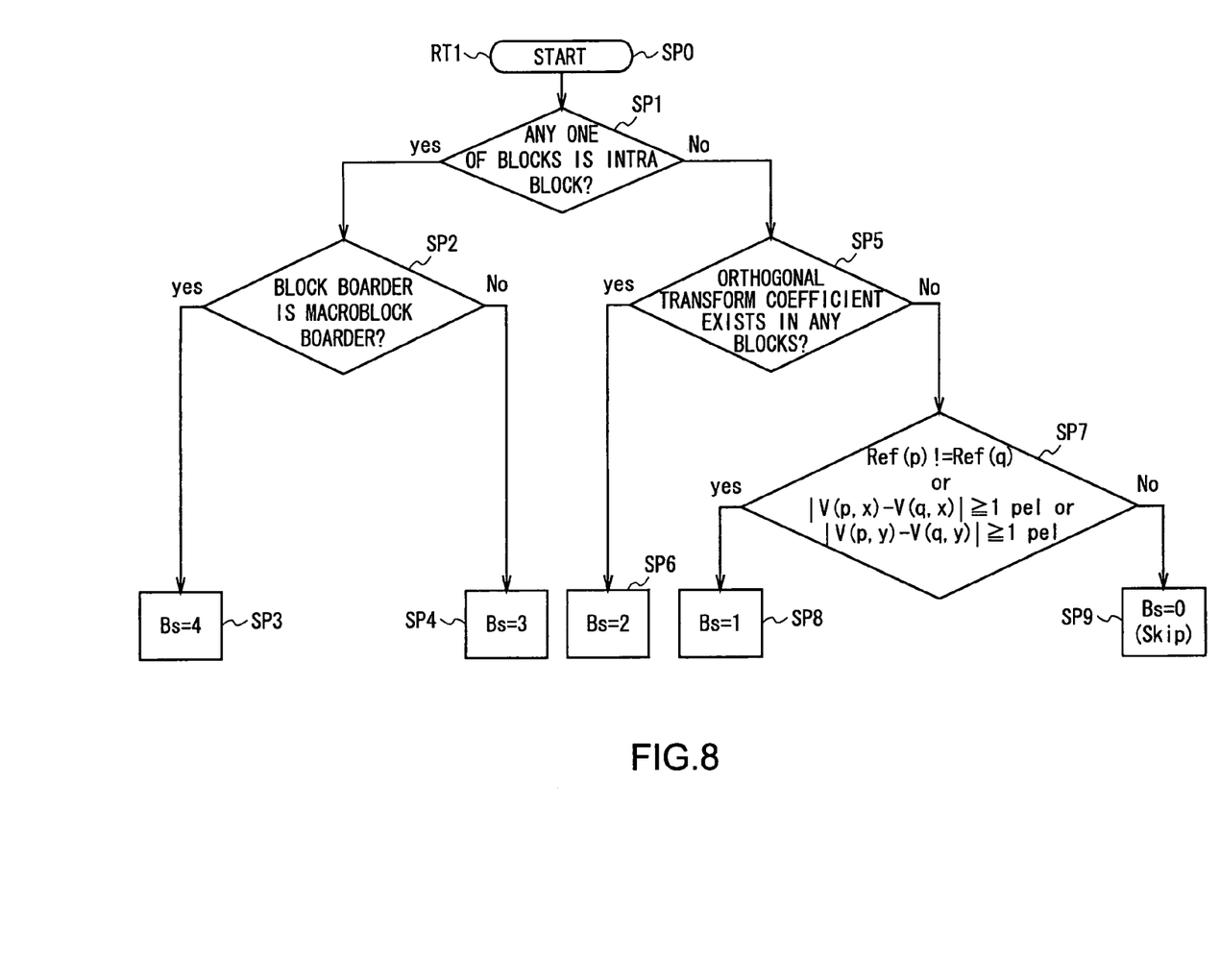
FIG. 8 is a flowchart showing a procedure for Bs determination.

At this time, filtering strength Bs to be applied to each block boarder of neighboring 4×4 blocks 13 is determined based on a procedure RT1 for Bs determination as shown in FIG. 8. Specifically, it is determined whether one of two 4×4 blocks 13 having a target block boarder therebetween is an intra block (step SP1). When an affirmative result is obtained, it is determined whether the block boarder between the two 4×4 blocks 13 is a macroblock boarder (step SP2). When this boarder is a macroblock boarder, the filtering strength Bs is determined as "4" (step SP3). When this boarder is not a macroblock boarder, the filtering strength Bs is determined as "3" (step SP4).

When both of the neighboring two 4×4 blocks 13 having the target block boarder therebetween are not intra blocks, it is determined whether one of the 4×4 blocks 13 has an orthogonal transform coefficient (step SP5). When an affirmative result is obtained, the filtering strength Bs is determined as "2" (step SP6).

When both of the 4×4 blocks 13 do not have an orthogonal transform coefficient, it is determined whether reference pictures for the two 4×4 blocks 13 are the same, whether the absolute difference value (|V(p,x)−V(q,x)|) of the components in a x-direction (V(p,x), V(q,x)) of the motion vectors of the two 4×4 blocks 13 (for example, block p and block q) has one or more pixels, or whether the absolute difference value (|V(p,y)−V(q,y)|) of the components in a y-direction (V(p,y), V(q,y)) of the motion vectors of the two 4×4 blocks 13 has one or more pixels (step SP7).

When any of the three conditions is satisfied, the filtering strength Bs is determined as "1" (step SP8). When none of the conditions are satisfied, the filtering strength Bs is determined as "0" (step SP9).

Note that as filtering strength Bs to be applied to each block boarder in the macroblock 14 of a color difference signal shown by dotted lines in FIGS. 7A and 7B, a value determined for the filtering strength Bs of the corresponding block boarder in the mackroblock 10 of a corresponding luminance signal is used.

Figure 9:
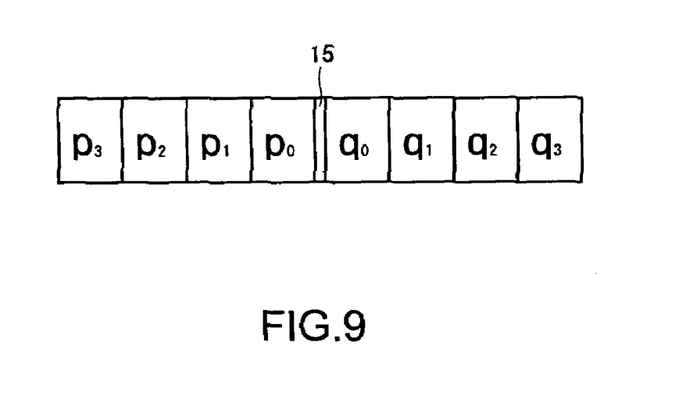
Figure 10:
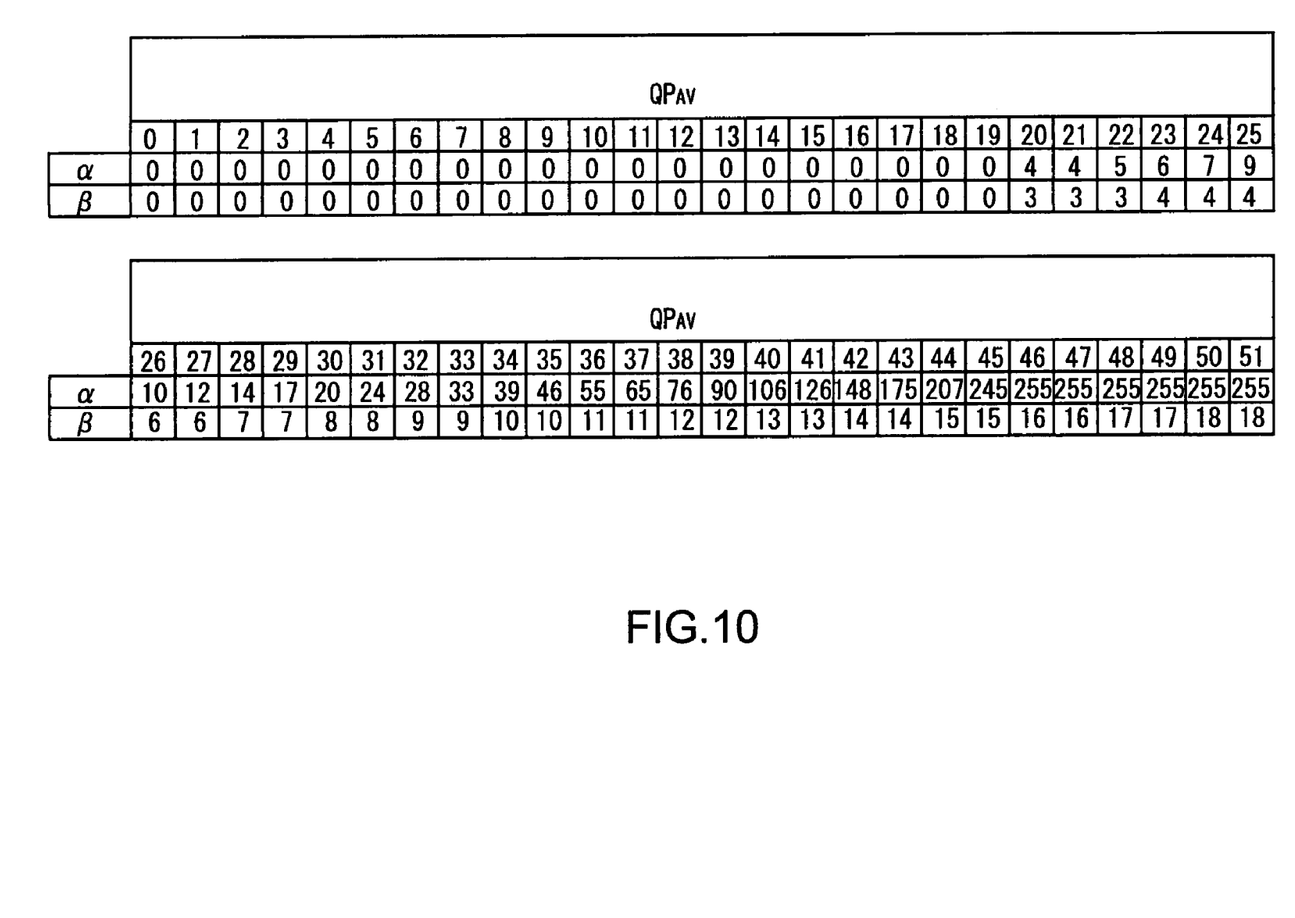
FIG. 10 is a table showing relationships between average values of quantization parameters and threshold values.

FIG. 9 shows a block boarder between 4×4 blocks 13 and surrounding eight pixels $p_0$ to $p_3$, $q_0$ to $q_3$ to be used for filtering. Although FIG. 9 shows a case of the horizontal filtering, the vertical filtering is the same. The pixels neighboring the block boarder 15 are $p_0$ and $q_0$, and the maximum pixels to be corrected by the deblock filtering process are four pixels $p_1$, $p_0$, $q_0$, $q_1$. The deblock filtering process is executed only when the filtering strength Bs is not "0" and the following expression (1) is satisfied.

$$|p_0-q_0|<\alpha \text{ and } |p_1-p_0|<\beta \text{ and } |q_1-q_0|<\beta \tag{1}$$

α and β in this expression (1) are threshold values which depend on the value of a quantization parameter QP as shown in FIG. 10. As this quantization parameter QP is larger, α and β are loosen. Specifically, α is a threshold value corresponding to a variation of the values of pixels neighboring a block boarder. β is a threshold value corresponding to a variation of the values of pixels in each 4×4 block 13. In other words, the expression (1) means that a region having a small variation of pixel values is subjected to the deblock filtering process and a region having a large variation of pixel values is identified as an edge and is not subjected to the deblock filtering process.

In a case where neighboring 4×4 blocks 13 have different quantization parameters QP, their average QPav is referred.

When the expression (1) is satisfied, on the other hand, the deblock filtering process is applied to the pixel $p_0$ and the pixel $q_0$ so that the following expressions are satisfied:

$$\Delta=\text{clip3}(-C, (((q_0-p_0)<<2+(p_1-q_1)+4)>>3))) \tag{2}$$

$$P_0=\text{clip1}(p_0+\Delta) \tag{3}$$

$$Q_0=\text{clip1}(q_0-\Delta\Delta) \tag{4}$$

where $P_0$ and $Q_0$ are the pixel values of the pixels $p_0$ and $q_0$ after the deblock filtering process.

Clip1 in the expressions (3) and (4) means [0, 255] clipping. That is, the expressions (2) to (4) mean a filtering process to add/subtract the same value Δ to the pixel $p_0$/from the pixel $q_0$ neighboring the block boarder 15 (FIG. 9).

Clip3 means [−C, +C] clipping. The value Δ is a value increasing/decreasing the pixel $p_0$/the pixel $q_0$ with the clipping values −C, C as the minimum and maximum values. The clipping value C of this case is determined based on the above-described average value QPav of quantization parameters QP and filtering strength Bs.

Now the determination on whether to perform the filtering process on the pixels $p_1$ and $q_1$ which face to each other via the pixels $p_0$ and $p_0$, and its process will be described. This filtering process is not applied to color difference components. That is, only the values of pixels neighboring a border can be corrected for color difference.

The filtering process of the pixel $p_1$ is executed when an activity parameter $a_p$ of the 4×4 block 13 satisfies the following expression (5).

$$a_P=|p_2-p_0|<\beta \tag{5}$$

In actual, when this expression (5) is satisfied because the activity parameter $a_P$ is less than the threshold value β, the filtering process defined by the following expression (6) is performed on the pixel $p_1$.

$$P_1=p_1+\text{clip3}(-C_0, C_0, (p_2+p_0+q_0)>>1-2\times p_1)>>1) \tag{6}$$

As in the case of the pixels $p_0$ and $q_0$, in this filtering process, the difference value clipped at clipping values $-C_0$, $C_0$ is added to the original pixel value.

Similarly, the filtering process of the pixel $q_1$ is performed when the activity parameter $a_q$ of the 4×4 block 13 satisfies the following expression (7).

$$a_q=|q_2-q_0|<\beta \tag{7}$$

At this time, the filtering process defined by the following expression (8) is performed on the pixel $q_1$.

$$Q_1=q_1+\text{clip3}(-C_0, C_0, (q_2+(p_0-q_0)>>1-2\times q_1)>>1) \tag{8}$$

Figure 11:
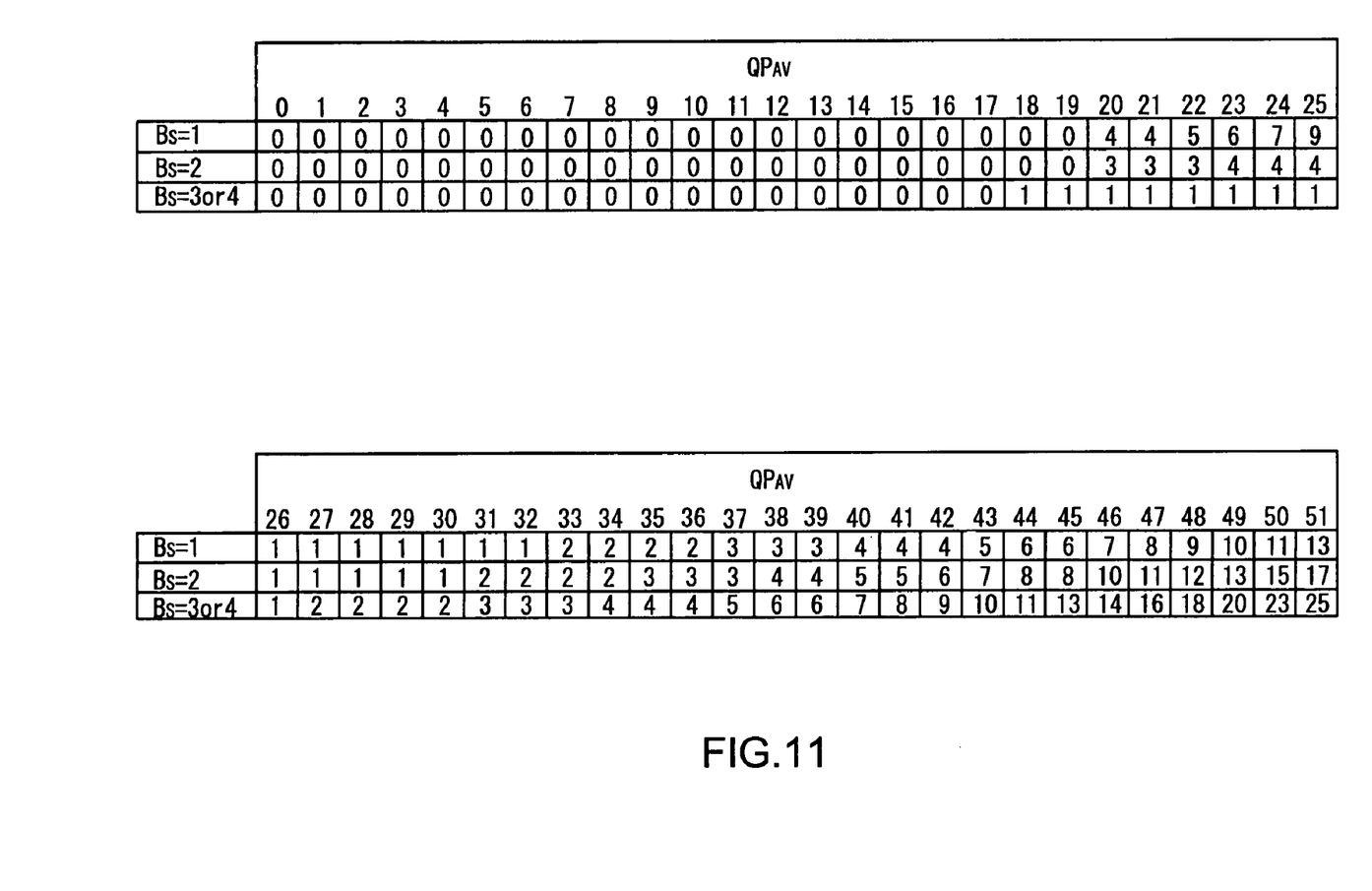
FIG. 11 is a table showing relationships among average values of quantization parameters, filtering strengths, and clipping values.

The clipping value $C_0$ is defined as shown in FIG. 11 and depends on the above-described average value QPav of quantization parameters QP and filtering strength Bs. In short, as the quantization parameter QP and the filtering strength Bs are both larger, a variation of pixel values larger than that of the original values is allowed.

The clipping value C in the expression (2) is a value obtained by adding "1" to the clipping value $C_0$ every time when the filtering process shown in the expression (8) is performed. Therefore, when the expressions (5) and (6) are both satisfied, $C=C_0+2$.

When Bs=4 (a block boarder is a macroblock boarder and one of two facing blocks having the block boarder therebetween is an intra block) and $a_p<\beta$ (activity parameter $a_p$ is less than the threshold value β), a strong filtering process defined by the following expressions (9) and (10) is applied since block noise appears remarkably in this block boarder.

$$P_0=(p_2+2\times p_1+2\times p_0+2\times q_0+q_1+4)>>3 \tag{9}$$

$$P_1=(p_3+2\times p_2+2\times p_1+2\times p_0+q_0+4)>>3 \tag{10}$$

In addition, on luminance components, the filtering process defined by the following expression (11) which treats one more pixel is performed.

$$P_2=(2\times p_3+3\times p_2+p_1+p_0+q_0+4)>>3 \tag{11}$$

If $a_p<\beta$ is not satisfied, the filtering process defined by the following expression (12) is performed on the pixels $p_0$ and $q_0$ neighboring the block border 15 (FIG. 9).

$$P_0=(2\times p_1+p_0+q_1+2)>>2 \tag{12}$$

On the pixels $q_1$ to $q_3$ of the 4×4 block 13 (FIG. 7A) existing on the right side of the block boarder 15, the similar process is performed.

When $a_p<\beta$ is satisfied, on the contrary, the filtering process defined by the following expressions (13) and (14) is applied.

$$Q_0=(p_1+2\times p_0+2\times q_0+2\times q_1+q_2+4)>>3 \tag{13}$$

$$Q_1=(p_0+2\times q_0+2\times q_1+2\times q_2+q_3+4)>>3 \tag{14}$$

In addition, on the luminance components, the filtering process defined by the following expression (15) is applied.

$$Q_2=(2\times q_3+3\times q_2+q_1+q_0+p_0+4)>>3 \tag{15}$$

When $a_q<\beta$ is not satisfied, the filtering process defined by the following expression (16) is applied.

$$Q_0=(2\times q_1+q_0+p_1+2)>>2 \quad (16)$$

(2) Construction of Decoding Apparatus of this Embodiment

Figure 12:
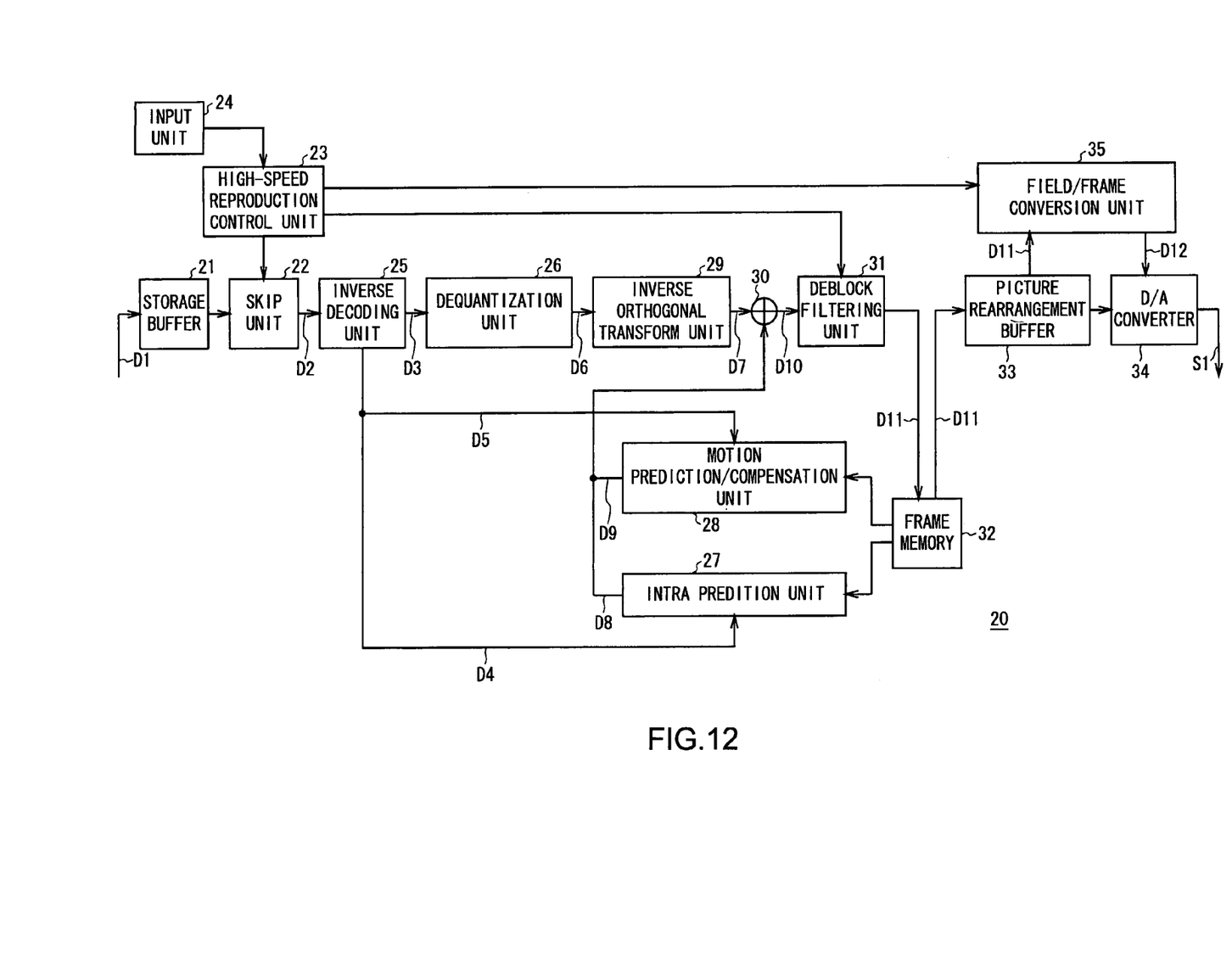
FIG. 12 is a block diagram showing a construction of a decoding apparatus according to this embodiment.

Referring to FIG. 12, reference numeral 20 shows a decoding apparatus in conformity with the JVT coding scheme according to this embodiment. This decoding apparatus sequentially stores in a storage buffer 21 image data (hereinafter, referred to as JVT coded image data) D1 given from the outside, which has been subjected to compression and coding based on the JVT coding scheme.

The JVT coded image data D1 being stored in the storage buffer 21 is read by a skip unit 22. Under the control of a high-speed reproduction control unit 23, this skip unit 22 sequentially reads all JVT coded image data D1 from the storage buffer 21 and sends them to an inverse decoding unit 25 as read JVT coded image data D2 in a case where a user selects a normal reproduction mode as a reproduction mode with an input unit 24.

The inverse decoding unit 25 applies a prescribed variable length decoding process and arithmetic decoding process according to the format of the received read JVT coded image data D2 to the data D2, and sends thus obtained quantized transform coefficient to a dequantization unit 26 as quantized transform coefficient data D3.

When a picture to be decoded is an intra-coded picture (I-picture or I-field), the inverse decoding unit 25 also decodes intra prediction mode information D4 being stored in the header part of the read JVT coded image data D2 of the picture and sends the resultant to an intra prediction unit 27. When a picture to be decoded is an inter-coded picture (P-picture, B-picture, P-field or B-field), on the other hand, the inverse decoding unit 25 also decodes motion vector information D5 being stored in the header part of the read JVT coded image data D2 of the picture and sends the resultant to a motion prediction/compensation unit 28.

The dequantization unit 26 applies a prescribed dequantization process to the received quantized transform coefficient data D3, and sends the obtained transform coefficient which has been subjected to orthogonal transform processes such as discrete cosine transform and Karhunen-Loeve transform, to an inverse orthogonal transform unit 29 as transform coefficient data D6. The inverse orthogonal transform unit 29 applies a prescribed four-dimensional inverse orthogonal transform process to the received transform coefficient data D6 and sends the obtained difference image data D7 to an adder 30.

When the picture to be decoded is an intra-coded picture, the adder 30 receives image data (hereinafter, referred to as predicted image data) D8 of predicted pictures which is created by the intra prediction unit 27 as described later. In this case, the adder 30 sequentially adds the difference image data D7 from the inverse orthogonal transform unit 29 and the predicted image data D8 from the intra prediction unit 27, and sends the obtained decoded image data of the I-picture or I-field to a deblock filtering unit 31 as decoded image data D10.

When the picture to be decoded is an inter-coded picture, the adder 30 receives image data (hereinafter, referred to as reference image data) D9 of a reference picture which is created by the motion prediction/compensation unit 28 as described later. In this case, the adder 30 sequentially adds the difference image data D7 from the inverse orthogonal transform unit 29 and the reference image data D9 from the motion prediction/compensation unit 28, and sends the obtained decoded image data of P-picture, B-picture, P-field or B-field to the deblock filtering unit 31 as decoded image data D10.

In the normal reproduction mode, under the control of the high-speed reproduction control unit 23, the deblock filtering unit 31 sequentially applies the above-described deblock filtering process to the received decoded image data D10 and stores the obtained image data of decoded pictures in which block distortion has been eliminated, in a frame memory 32 as filtered decoded image data D11.

The filtered decoded image data D11 being stored in the frame memory 32 is read out frame-by-frame or field-by-field after being rearranged in an order before the JVT coding is performed by means of an picture rearrangement buffer 33. Then in the normal reproduction mode, the data is converted to an analog signal in a digital-to-analog converter 34 and is output to the outside as a reproduction video signal S1 under the control of the high-speed reproduction control unit 23.

When the intra-prediction unit 27 receives intra-prediction mode information D4 from the inverse decoding unit 25, it creates image data of a predicted picture of an intra-coded picture to be decoded, based on the intra-prediction mode information D4 and the filtered decoded image data D11 being stored in the frame memory 32, and sends this data to the adder 30 as predicted image data D8 as described above.

When the motion prediction/compensation unit 28 receives the motion vector information D5 from the inverse decoding unit 25, it creates image data of a reference picture based on the motion vector information D5 and the filtered decoded image data D11 being stored in the frame memory 32, and sends this data to the adder 30 as reference image data D9 as described above.

Then the filtered decoded image data D11 being stored in the frame memory 32 is read frame-by-frame or field-by-field after being rearranged in an order of pictures before the JVT coding is performed by the picture rearrangement buffer 33. In the normal reproduction mode, under the control of the high-speed reproduction control unit 23, the data is converted into an analog signal in the digital-to-analog converter 34 and is output to the outside as a reproduction video signal S1.

As described above, the decoding apparatus 20 performs normal reproduction on received JVT coded image data D1 in a normal reproduction mode.

In the case where the user selects a high-speed reproduction mode as a reproduction mode with the input unit 24, on the other hand, the decoding apparatus 20 deletes JVT coded image data D1 of coded pictures (P-picture, B-picture, P-field and B-field) other than JVT coded image data D1 of I-frame (I-picture) subjected to the frame-structured coding and JVT coded image data D1 of I-field subjected to the field-structured coding, out of the JVT coded image data D1 being stored in the storage buffer 21, from the storage buffer 21 under the control of the high-speed reproduction control unit 23.

Specifically, since the value of field_pic_flag included in the slice header of the JVT coded image data D1 of a picture subjected to the frame-structured coding is "0" and the value of field_pic_flag in the JVT coded image data D1 of a picture subjected to the field-structured coding is "1" as described above, the skip unit 22 deletes from the storage buffer 21 JVT coded image data D1 other than the JVT coded image data D1 of I-picture for pictures with the field_pic_flag of "0" and the JVT coded image data D1 of I-field for pictures with the field_pic_flag of "1".

The skip unit 22 sequentially reads the remaining JVT coded image data D1 of I-picture having the frame structure and the remaining JVT coded image data D1 of I-field having the field structure, from the storage buffer 21, and sends them to the inverse decoding unit 25 as read JVT coded image data D2.

As a result, the read JVT coded image data D2 is processed by the inverse decoding unit 25, dequantization unit 26, inverse orthogonal transform unit 29, and adder 30 as in the case of the above-described normal reproduction mode. Thus obtained decoded image data D10 of I-picture or I-field is given to the deblock filtering unit 31.

Under the control of the high-speed reproduction control unit 23, the deblock filtering unit 31 stores the received decoded image data D10 in the frame memory 32 as filtered decoded image data D11 as it is, without performing the deblock filtering process.

The filtered decoded image data D11 being stored in the frame memory 32 is used for creation of the intra-predicted image data D8 or reference image data D9 in the intra prediction unit 27 and the motion prediction/compensation unit 28 as described above, and is also read from the frame memory 32 at prescribed timing and stored in the picture rearrangement buffer 33.

In addition, in the high-speed reproduction mode, under the control of the high-speed reproduction control unit 23, the filtered decoded image data D11 being stored in the picture rearrangement buffer 33 is rearranged by the field/frame conversion unit 35 in an order of pictures before the JVT coding is performed and is read frame-by-frame or field-by-field.

Figure 13A:
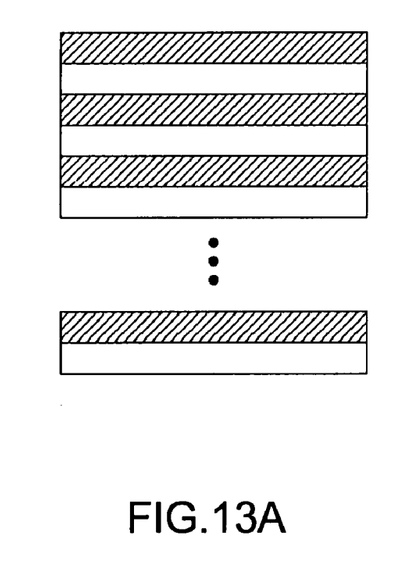
FIGS. 13A to 13C are conceptual views explaining a process by a filed/frame conversion unit.
Figure 13B:
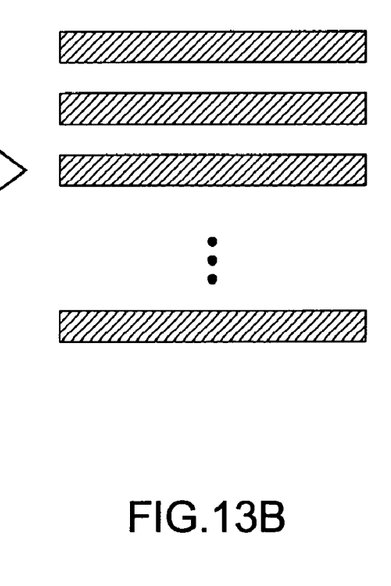
Figure 13C:
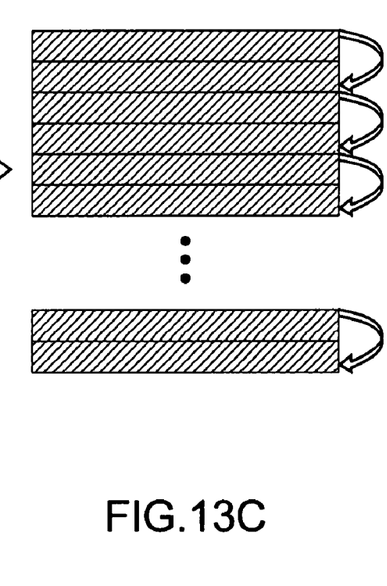

Then in the high-speed reproduction mode, under the control of the high-speed reproduction control unit 23, when the filtered decoded image data D11 read from the picture rearrangement buffer 33 is data of I-picture having the frame structure as shown in FIG. 13A, the field/frame conversion unit 35 deletes the filtered decoded image data D11 in the second field as shown in FIG. 13B, creates image data by copying the filtered decoded image data D11 of a line one above in the first field as filtered decoded image data D11 of the corresponding line in the second field as shown in FIG. 13C, and sends the image data to the digital/analog converter 34 as field/frame conversion image data D12. As a result, in the high-speed reproduction mode, under the control of the high-speed reproduction control unit 23, this field/frame conversion image data D12 is converted into an analog signal in the digital-to-analog converter 34 and is output to the outside as a reproduction video signal S1.

On the contrary, in the high-speed reproduction mode, when the filtered decoded image data D11 read from the picture rearrangement buffer 33 is data of I-field having the field structure as shown in FIG. 13B, the field/frame conversion unit 35 creates image data by copying the filtered decoded image data D11 of a line one above in the first field as filtered decoded image data D11 of the corresponding line in the second field, and sends this image data to the digital-to-analog converter 34 as field/frame conversion image data D12. As a result, in the high-speed reproduction mode, under the control of the high-speed reproduction control unit 23, this field/frame conversion image data D12 is converted into an analog signal in the digital-to-analog converter 34 and is output to the outside as a reproduction video signal S1.

As described above, in a case where the high-speed reproduction mode is selected, the decoding apparatus 20 performs high speed reproduction of received JVT coded image data D1 by decoding only I-pictures for pictures subjected to the frame-structured coding or only I-fields for pictures subjected to the field-structured coding.

(3) Operation and Effects of this Embodiment

According to the above configuration, in the high-speed reproduction mode, as to pictures of the interlace format, the decoding apparatus 20 decodes only I-pictures for pictures subjected to the frame-structured coding and only I-fields for pictures subjected to the field-structured coding, without performing the deblock filtering process.

Therefore, in the high-speed reproduction mode, the decoding apparatus 20 does not need complicated processes such as a motion compensation process which is required for decoding P-pictures, B-pictures, P-fields or B-fields, and is able to eliminate time required for the deblock filtering process, resulting in performing high-speed reproduction of JVT coded image data D1 with a simple consfiguration.

Further, in this case, when the decoding apparatus 20 decodes only I-fields (first field) of I-pictures subjected to the field-structured coding, it creates reproduction video of the I-pictures by copying them in the second field. When the decoding apparatus 20 decodes I-pictures subjected to the frame-structured coding, it creates reproduction video of the I-pictures by copying the first field in the second field. As a result, I-pictures subjected to the frame-structured coding and I-pictures subjected to the field-structured coding can have the same picture quality.

Thus the decoding apparatus 20 is able to previously and effectively prevent distortion of video reproduced at a high speed due to such a situation that decoded pictures of I-pictures subjected to the frame-structured coding having good picture quality and decoded pictures of I-pictures subjected to the field-structured coding having bad picture quality are mixed and displayed.

In a case of creating reproduction video by copying the first field in the second field to reproduce pictures of I-picture or I-field as described above, although the resolution in a vertical direction deteriorates by half, this deterioration does not cause any problem because human beings cannot recognize it in the high-speed reproduction.

According to the above configuration, in the high-speed reproduction mode, as to pictures of the interlace format, only I-pictures for pictures subjected to the frame-structured coding and only I-fields for pictures subjected to the field-structured coding are decoded, without applying the deblock filtering process. Therefore, complicated processes such as the motion compensation process is not required and time required for the deblock filtering process can be omitted, thus making it possible to realize a decoding apparatus capable of performing high-speed reproduction of JVT coded image data D1 with a simple configuration.

(4) Other Embodiments

In the embodiment described above, this invention is applied to a decoding apparatus 20 in conformity with the JVT coding scheme. This invention, however, is not limited to this and can be widely applied to other decoding apparatuses which decode coded image data composed of image data coded with a prescribed coding scheme for adaptively performing field-structured or frame-structured coding.

In this case, in the embodiment described above, the skip unit 22, inverse decoding unit 25, dequantization unit 26, inverse orthogonal transform unit 29, adder 30, intra prediction unit 27, and motion prediction/compensation unit 28 composes a decoding means for decoding coded image data (JVT coded image data D1). However, the decoding means can have a construction appropriate for a coding scheme that a decoding apparatus employing this invention is in conformity with.

Further, in this case, in the embodiment described above, since the coded image data to be decoded has been coded with the JVT coding scheme, a filtering means for performing a filtering process on decoded image data performs the deblock filtering process. This invention, however, is not limited to this and if this invention is applied to a decoding apparatus for decoding image data coded with another coding scheme and the filtering process of the decoded image data requires a large amount of operations and takes a lot of time, the filtering means can be controlled so as not to perform the filtering process in the high-speed reproduction mode as in the case of the embodiment described above.

Further, in the embodiment described above, the decoding means composed of the skip unit 22, inverse decoding unit 25, dequantization unit 26, inverse orthogonal transform unit 29, adder 30, intra prediction unit 27 and motion/compensation unit 28 decodes only I-pictures having the frame structure and I-fields having the field structure, out of the JV coded image data D1 being stored in the storage buffer 21, under the control of the high-speed reproduction control unit 23 serving as a control means for controlling the decoding means. This invention, however, is not limited to this and only one of the first and second fields of the I-pictures can be decoded, instead of the I-pictures having the frame structure. In this case, the skip unit 22 may delete the JVT coded image data D1 of one field of the I-pictures together with JVT coded image data D1 of P-pictures etc., from the storage buffer 21.

In addition, in this case, the field/frame conversion unit 35 serving as a field/frame conversion means for creating the image data of frame pictures from the image data of field pictures may create the image data of decoded pictures by taking the filtered decoded image data D11 of the first or second field obtained by decoding I-pictures having the frame structure as one field and copying the filtered decoded image data D11 in the other field.

According to this invention described above, the video decoding apparatus for decoding coded image data composed of image data subjected to coding with a prescribed coding scheme for adaptively performing field-structured or frame-structured coding comprises a decoding means for performing a decoding process on coded image data and a control means for controlling the decoding means. The control means controls the decoding means so as to perform the decoding process on only coded image data of intra-frame coded pictures subjected to the frame-structured coding or of one field in the intra-frame coded pictures, and coded image data of intra-field coded pictures subjected to the field-structured coding. Therefore, only intra-frame coded pictures and intra-field coded pictures can be sequentially decoded, without performing a complicated motion compensation process, thus making it possible to realize a video decoding apparatus capable of performing high-speed reproduction with a simple configuration.

In addition, according to this embodiment, with a video decoding method for decoding coded image data composed of image data subjected to coding with a prescribed coding scheme for adaptively performing field-structured or frame-structured coding, in the high-speed reproduction mode, only coded image data of intra-frame coded pictures subjected to the frame-structured coding or of one field of the intra-frame coded pictures and coded image data of intra-field coded pictures subjected to the field-structured coding are decoded. Therefore, only the intra-frame coded pictures and intra-field coded pictures can be sequentially decoded, without performing a complicated motion compensation process, thus making it possible to realize a video decoding method capable of performing high-speed reproduction with a simple configuration.

While there has been described in connection with the preferred embodiments of the invention, it will be obvious to those skilled in the art that various changed and modifications may be aimed, therefore, to cover in the appended claims all such changes and modifications as fall within the true spirit ad scope of the invention.

What is claimed is:

1. A video decoding apparatus for performing a decoding process on coded image data comprising image data subjected to a prescribed coding scheme for adaptively performing field-structured coding or frame-structured coding, the video decoding apparatus comprising:
    decoding means for decoding the coded image data;
    control means for controlling, in a high-speed reproduction mode, the decoding means to perform the decoding process only on intra-frame coded pictures of the coded image data subjected to the frame-structured coding or on intra-field coded pictures of the coded image data subjected to the field-structured coding to obtain decoded image data; and
    field/frame conversion means for copying a first field of the decoded image data decoded in the decoding means into a second field of the decoded image data to create image data of a decoded picture.

2. The video decoding apparatus according to claim 1, further comprising
    filtering means for performing a prescribed filtering process on decoded image data obtained by performing the decoding process on the coded image data, wherein the control means controls, in the high-speed reproduction mode, the filtering means so as not to perform the filtering process on the decoded image data.

3. The video decoding apparatus according to claim 2, wherein
    the filtering process is a deblock filtering process to reduce block noise.

4. A video decoding method for performing a decoding process on coded image data comprising image data subjected to a prescribed coding scheme for adaptively performing field-structured coding or frame-structured coding, the video decoding method being performed by a video decoding apparatus and comprising:
    performing the decoding process, in a high-speed reproduction mode, only on intra-frame coded pictures of the coded image data subjected to the frame-structured coding or on intra-field coded pictures of the coded image data subjected to the field structured coding to obtain decoded image data; and
    copying a first field of the decoded image data into a second field of the decoded image data to create image data of a decoded picture.

5. The video decoding method according to claim 4, wherein
    a prescribed filtering process is applied to decoded image data obtained by performing the decoding process on the coded image data in a normal-speed reproduction mode, and the filtering process is not performed on the decoded image data in the high-speed reproduction mode.

6. The video decoding method according to claim 5, wherein
    the filtering process is a deblock filtering process to reduce block noise.

7. A video decoding apparatus for decoding coded image data, the apparatus comprising:
    a decoding unit for decoding the coded image data subjected to frame-structured coding or field-structured coding to create decoded image data without performing a deblock filtering process, the decoded image data including a first field and a second field; and a field/frame conversion unit for copying the first field in the second field to create converted decoded image data.

8. The video decoding apparatus of claim 7, further comprising a digital/analog converter converting the converted decoded image data into a reproduction video signal.

9. The video decoding apparatus of claim 7, wherein the decoding unit comprises:

an intra prediction unit creating intra-predicted image data; and an adder adding the intra-predicted image data with difference image data to obtain the decoded image data.

10. The video decoding apparatus of claim 7, wherein the decoding unit comprises:

a motion prediction/compensation unit creating reference image data; and an adder adding the reference image data with difference image data to obtain the decoded image data.

* * * * *